June 29, 1965   J. L. SLONNEGER   3,192,346
CURRENT AND TEMPERATURE SNAP ACTING DEVICES
Filed June 3, 1963
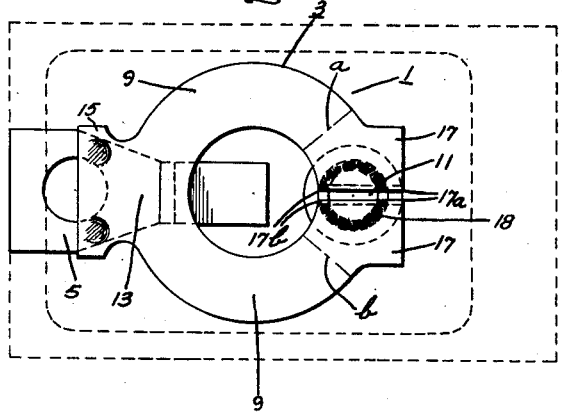
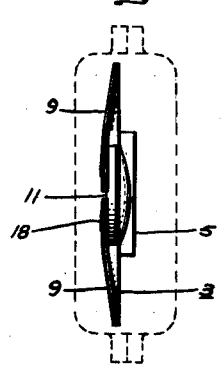
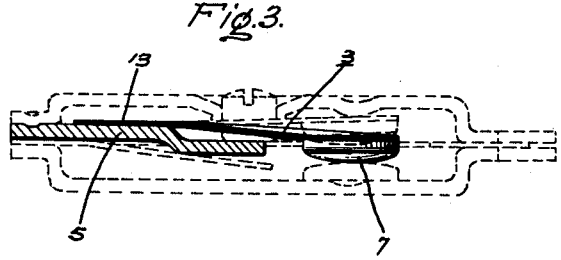
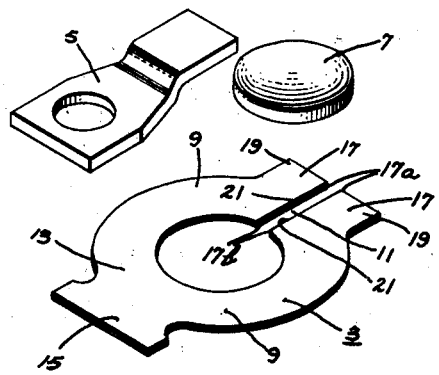
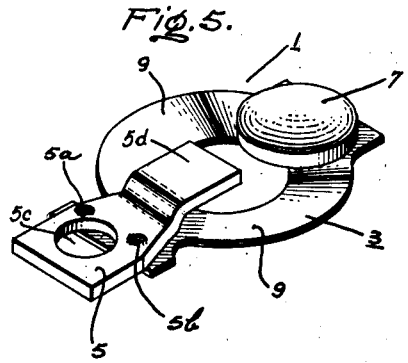
Inventor:
John L. Slonneger,
by H. F. Mankek, Jr.
Attorney.

United States Patent Office 3,192,346
Patented June 29, 1965

3,192,346
CURRENT AND TEMPERATURE SNAP
ACTING DEVICES
John L. Slonneger, Morrison, Ill., assignor to General
Electric Company, a corporation of New York
Filed June 3, 1963, Ser. No. 286,128
4 Claims. (Cl. 200—138)

This is a continuation-in-part of application Serial No. 11,718, filed February 29, 1960, now abandoned, for Thermally Responsive Snap Action Device.

My invention relates to snap acting devices, and more particularly to current and temperature responsive snap acting devices of the reversible dished type, being especially suitable for use in protecting motors and other electrical apparatus from overheating.

In many electrical applications it is desirable, if not necessary, to prevent overheating of the electrical apparatus by disconnecting the apparatus or a component thereof when the current exceeds a predetermined level. A current overload condition is generally accompanied by an increase in the temperature of certain operating components, such as motor winding, reactor, etc. For example, in certain motor applications, in order to prevent overheating of the stator windings it is necessary that the stator windings be disconnected from the power supply when the current reaches a level where overheating may result. Unless the windings are disconnected, the current overload condition will cause overheating that may result in a degradation of the winding insulation and may even create an electrical and fire hazard. In order to protect the insulation of the components against possible damage due to overheating, it is required that a suitable time delay be provided after the unit is disconnected to allow the heat generated as a result of the overload condition to be dissipated from the component before the apparatus or component is again energized.

At the present time Underwriters' Laboratories prescribe a temperature limit of 140 degrees centigrade for Class A insulation in a motor under running conditions. Protective devices generally used in motors sense the current and actuate a normally closed switch to the open position before the current can reach a magnitude where it will cause an overheating. Preferably, the protective device should be responsive to both temperature and current levels and should not be actuated in response to the sudden but short increase in current which occurs under starting conditions. Also, it is necessary that a suitable time delay be provided after the switch is actuated to permit the heat in the motor winding to be dissipated before the switch is reset by the protective device.

Internally stressed thermally snap acting devices of the reversible dished type are particularly suitable for use as protective devices and may be formed from a strip of bimetal. The bimetal may be actuated by thermal self-deformation in response to current and temperature conditions. Heretofore snap acting devices of the dished bimetal type have been particularly difficult to manufacture. These types of devices which otherwise most readily adapt themselves to economical manufacturing have not been of a form which lends itself to the inclusion of an efficient and inexpensive means for controlling the critical temperatures to which the device is responsive. Snap acting devices of this type which have been used in the prior art require trial and error methods for forming the bimetals before they are completely assembled and adjusted. For example, bimetals used in the prior art have been punched from a sheet of bimetal material, dented or deformed to provide the desired snap action, and then mounted to a suitable support. By following this procedure, and mounting the bimetals to the support after they have been formed, many of the bimetals subsequently fail to perform satisfactorily in snapping at the right temperature level, due to the imprecise formation thereof. These bimetals are also stressed to a relatively high temperature differential during the adjustment thereof. Such a trial and error requirement, of course, adds to the expense of manufacturing the snap action device. It has therefore been deemed desirable to provide a snap acting device which does not require any trial and error procedure in the forming and assembly process prior to adjustment and which may therefore be economically manufactured and efficiently adjusted.

The principal object of this invention is to provide an improved current and temperature responsive snap acting device which, because of its relative simplicity, can be manufactured at a reduced cost.

Another object of this invention is to provide a new and improved snap acting device of the dished internally stressed overcenter type which is easy to assemble, and capable of being readily adjusted.

A further object of this invention is to provide a new and improved snap acting device which includes a dished bimetal disk that is internally stressed and formed by a very simplified means.

A still further object of this invention is to provide an improved current and temperature responsive snap acting bimetallic device whereby a suitable delay can be provided before the device is reset.

In carrying out my invention, in one form thereof, I utilize an essentially annular thermally responsive bimetallic element. This bimetallic element has a pair of arcuate arms with the ends thereof separated by a gap. The bimetallic element is affixed to a heating or current sensing member at a location opposite to the gapped ends so that the gapped ends are suspended from the support in cantilever fashion. The gapped ends of the bimetallic element are then drawn toward each other to reduce the gap by a desired amount and stress the disk into a dished formation. In order to maintain the gapped ends of the bimetallic element in this drawn position a contact button may be welded to the gapped ends of the bimetallic element, and the size of the gap determines the temperature differential of the device. By adjusting the gapped ends of the bimetallic element, the desired snap action for the bimetal disk and an integrally affixed movable switch contact and blade assembly thus are concurrently achieved.

In another aspect of my invention the current sensing member, which is attached to the bimetallic element at a location diametrically opposite to the gapped ends, has a section with a restricted cross-sectional area. This restricted section is proportioned so that when the current flow through the member exceeds a predetermined level, heat is generated in the restricted section or sections of the current sensing member and transferred by conduction to the bimetallic element. Thus, the bimetallic element will respond not only to its ambient temperature but will also respond to the current flow through the device if it is of sufficient magnitude to heat the restricted section.

Further aspects of my invention will become apparent hereinafter, and the specification concludes with claims particularly pointing out and distinctly claiming the subject matter which I regard as my invention. The invention, as to organization and method of operation, together with further objects and advantages thereof, may best be understood by reference to the following description when taken in conjunction with the accompanying drawings in which:

FIG. 1 is a plan view of a current and temperature operated snap action device embodying my invention, with a dotted representation of a suitable housing for a switch in which the device might be incorporated;

FIG. 2 is an end view of the snap action device of FIG. 1;

FIG. 3 is an elevational view partially in section of the snap action device of FIG. 1;

FIG. 4 is an exploded view of the snap action device of FIG. 1, showing the bimetal, the contact button, and the support; and FIG. 5 is a perspective view of the snap action device of FIG. 1, showing it ready for assembly into a suitable switch housing.

Referring now to the drawing, and more particularly to FIG. 5, I have shown a current and temperature responsive snap action device 1 which consists of only three basic parts. In the illustrated exemplification of the invention this device includes a split dished annular bimetallic element 3 which provides the snap action effect, a suitable heating or current sensing member 5 mounted on one side of the bimetallic element 3 in a switch housing, and a contact 7 which is movable with the bimetallic element 3 in response to certain predetermined temperature conditions and serves as a movable switch contact, which as applied to a motor was normally closed.

To reduce the number of parts required in a switch into which my bimetallic element 3 is incorporated, bimetallic element 3 has been designed to serve as a snap acting switch blade which supports movable contact 7. More specifically, bimetallic element 3 is formed from a normally flat sheet of bimetal material essentially in the shape of a ring with a gap formed therein. (See FIG. 4.) One type of bimetallic material which might be advantageously utilized consists of two metallic sheets secured together in fixed relation and having a resistance of 100 ohms per circular mil foot and a thickness of 0.008 inch. The element 3 formed of the two metallic sheets has a pair of curved arms 9 which terminate at their gapped ends 17 in a radially extending gap 11 and are connected together at their supported base portion 13. As shown, the gapped ends 17 of the element 3 project outwardly from the main arm of the arms 9, thereby to provide an additional area for supporting the contact 7. The base portion 13 is diametrically opposite to gap 11 so that after the bimetallic element 3 is properly stressed to provide the desired snap action, as shall hereinafter be described, the gapped end of the element 3 may move in cantilever fashion. Projection 15 is provided as an outward extension of base portion 13 of the bimetallic element 3 to affix bimetallic element 3 to the heating member 5 in cantilever fashion by attaching the projection 15 to the heating member at points 5a and 5b. (See FIG. 5.)

It will, of course, be understood by those skilled in the art, that various configurations of the heating or current sensing member 5 may be utilized in accordance with the overall arrangement and electrical capacity of the switch in which the snap acting device 1 is to be incorporated. Although in the illustrated embodiment of my invention the contact button 7 is attached to the gapped ends 17 and the bimetallic element 3 is supported by the current sensing member 5, it will be apparent to those skilled in the art that the improved arrangement can be modified by reversing the manner in which the bimetallic element is supported. For example, it will be appreciated that the bimetallic element 3 can be supported at the gapped ends 17 and that the contact button 7 may be attached to the end portion 5d of the current sensing member 5 arranged so that it is displaced by the snap action of the element 3. So modified, the bimetallic element 3 would carry both the current sensing member 5 and the contact button 7.

In designing a current and temperature responsive snap acting device, it is important to provide a simplified means for accurately adjusting the bimetallic element 3 to the desired temperature response. For example, if a snap acting device is to be used in a switch which serves as a motor protector, it might be desirable to adjust the device so that the contacts of the switch which it actuates will snap open when the element 3 reaches 120° C., and will close again after a predetermined delay or when the element 3 cools to a temperature of 80° C. To enhance the desirability of a snap acting bimetallic device for this switch application, a convenient means should be provided for accurately adjusting the bimetallic element 3 so that it will snap the contacts of the switch open at 120° C. and snap the contacts closed at 80° C. It is very important to provide a convenient means for adjusting the level of temperature response for the bimetallic element 3, which means should be separate from and independent of the temperature setting means for adjusting the temperature differential, i.e., the difference in temperature between the temperatures at which the contacts open and close. In my improved snap acting device, I have provided a convenient and simplified means for independently adjusting the bimetallic element 3 to the desired temperature response and temperature differental, and this shall now be described.

To dish bimetallic element 3 to the proper concavity and thus provide the desired snap action for my device, I draw the gapped ends 17 of arms 9 toward each other in a suitable mechanically adjustable tool (not shown). Thus, the gap 11 is adjusted to provide the desired temperature differential for the snap acting device. As this gap is generally decreased, the temperature differential of the bimetallic element 3 is thereby increased.

For the purpose of furnishing convenient gripping surfaces for this drawing operation, squared corners 19 are provided on the gapped ends or tabs 17 of the arcuate arms 9. With the gapped ends 17 of the bimetallic element 3 held closer together but spaced apart in a coplanar relationship, as shown in FIG. 2, the gapped ends 17 of the arcuate arms are thus pulled toward each other, and the bimetallic element 3 is stressed to form a snap acting essentially annular bimetallic disk. Oppositely disposed surfaces 21 of the gapped ends 17 of the bimetallic element 3, border the gap 11 and before the gapped ends are drawn together these surfaces 21 are in a generally parallel spaced relationship. After the gapped ends 17 of the bimetallic element 3 have been drawn toward each other to provide the desired gap 11, they are still spaced apart, and surfaces 21 are pulled closer towards each other at their outer corners 17a, with their inner corners 17b being also pulled closer towards each other, but to a lesser amount than corners 17a. (See FIG. 1.)

While the gapped ends 17 of bimetallic element 3 are thus drawn toward each other to provide the desired snap action effect for the device and are generally coplanar, I weld contact button 7 to one side of the gapped ends 17 of the bimetallic element 3 by weld 18. This welded contact button bridges gap 11, as shown in FIG. 2, and is integrally associated with the gapped end 17 of each arcuate arm 9 so as to retain the desired stresses in the dished bimetallic element 3.

It will thus be seen that in forming my snap action device by welding the contact button to the drawn ends of the bimetallic element 3, I have provided a simplified and inexpensive contact and blade assembly which is thermally responsive and electrically conductive, and at the same time I have adjusted the snap acting bimetallic element 3 to the desired temperature differential, all in one operation.

Although in the illustrated embodiment of my invention, I have bridged the gap ends 17 of the bimetallic element 3 by welding, it will be appreciated that the other suitable means for bridging the gap to maintain the desired spacing therebetween may be used in the practice of the present invention.

After my bimetallic element 3 has been mounted to the heating member 5, and the gapped ends 17 have been drawn together the desired distance by welding contact button 7 thereto, I have provided a simplified means for adjusting the blade assembly thus formed to the desired temperature response. More particularly, after the bimetallic element 3 has been welded to member 5 and dished by the welded contact, the bimetallic element 3 is bent along radial lines which are spaced from but adjacent to the gap 11. These radial lines of deformation are indicated as dotted lines *a* and *b* in FIG. 1, and by bending the bimetallic element approximately along these lines, the temperature level at which the bimetallic element 3 snaps from one position to another may be adjusted.

It will be understood by those skilled in the art, that by deforming the bimetallic element 3 in this manner, the reset temperature, or temperature at which the switch contacts snap closed, is thereby adjusted primarily, with a small adjustment also thus being made in the trip temperature, or temperature, at which the contacts snap open. This adjustment of the temperature response does not affect the temperature differential which is established in the bimetallic element 3 by the welded contacts, and it is independent of that particular adjustment. In other words, the bending of the element 3 controls the temperature level at which the disk snaps open and closed, but does not significantly change the temperature differential between the opening and closing of the switch contacts, which was previously established by the spacing of the gapped ends 17.

The rate at which the temperature differential attained by the bimetallic element 3 is dissipated is controlled to some extent by the heat which is conducted away from the bimetallic element 3 through the current sensing member 5. It will be appreciated that the restricted portions formed by the aperture 5c are designed so that sufficient heat is generated in the heating member 5 when the current exceeds a predetermined level, and this heat is transferred by conduction to the bimetallic element 3 to cause the element to snap open. However, when the bimetallic element 3 is in the open position as shown in dashed outline in FIG. 3, the button 7 does not contact the lower button, and the only path for the transfer of heat by conduction from the bimetallic element 3 is through the current sensing member 5. Thus the restricted section of the current sensing member 5 will, in effect, throttle the conduction of the heat energy from the bimetallic element 3 to provide a time delay before the temperature differential is reached. This feature of the invention is particularly important in motor applications where it is desirable to provide a considerable time delay to allow the windings to cool sufficiently before the switch is reset by the current and temperature responsive snap acting device 1. Also, the current sensing member 5 and the bimetallic element 3 have sufficient thermal mass to withstand a current surge such as occurs during the starting condition of the motor.

From the foregoing description it will be apparent that that I have provided a new and improved current and temperature responsive snap action device that can be economically manufactured and that can be readily adjusted for various temperature and current conditions and that will not be activated by current surges of short duration. It should be realized that certain aspects of my invention may be incorporated efficiently and beneficially in other various types of internally stressed thermally responsive snap acting devices of the dished type.

While in accordance with the patent statutes, I have described what at present is considered to be the preferred embodiment of my invention, it will be obvious to those skilled in the art that various changes and modifications may be made therein without departing from my invention, and I, therefore, intend in the following claims to cover all such equivalent variations as fall within the true spirit and scope of this invention.

What I claim as new and desire to secure by Letters Patent of the United States is:

1. A current and temperature responsive snap acting device comprising: a bimetallic element having a pair of arcuate arms joined at one end and spaced at the other ends to provide a gap therebetween, means for maintaining the gap between the ends of the arcuate arms of said bimetallic element to stress said bimetallic element in a dished formation thereby to provide a predetermined temperature differential between the temperature at which said bimetallic element is actuated and the temperature at which said bimetallic element is reset, a current sensing member attached to said bimetallic element at a location opposite to the gapped ends thereof, and having a restricted cross-section to thereby cause heat to be generated therein when the current through said restricted section reaches a predetermined level, the attachment between the current sensing member and the bimetallic element causing said heat to be transferred by conduction to said bimetallic element for actuation thereof, said restricted cross-section of said current sensing member retarding the transfer of heat by conduction away from said bimetallic element after said bimetallic element is actuated to delay the resetting of said bimetallic element, and a contact button carried by said bimetallic element so that a physical displacement is imparted thereto when said bimetallic element is actuated.

2. The current and temperature responsive snap acting device set forth in claim 1 wherein said means for maintaining the gap between the ends of the arcuate arms of the bimetallic element is comprised of a weld which fixes the spacing of the gap and joins said contact button thereto.

3. A current and temperature responsive snap acting switch blade comprising: a bimetallic element having a pair of arcuate arms joined at one end and spaced at the other end to provide a gap therebetween, means for bridging the gap between the ends of said arcuate arms to stress said bimetallic element in a dished formation thereby to provide a predetermined temperature differential between the time at which said bimetallic element is actuated and the temperature at which said bimetallic element is reset, a current sensing member attached to said bimetallic element at a location opposite to the gapped ends thereof and having a restricted cross-section to cause heat to be generated when the current therethrough reaches a predetermined level, the attachment between said current sensing member and bimetallic element causing said heat to be transferred by conduction to said bimetallic element for actuating said bimetallic element by a snap action, said restricted cross-section retarding the transfer of heat by conduction away from said bimetallic element after said bimetallic element is actuated to delay the resetting thereof and a contact button carried by said bimetallic element so that a physical displacement is imparted to said contact button when said bimetallic element is actuated and reset, said bimetallic element being bent adjacent the gap ends thereof to calibrate the temperature at which said bimetallic element is reset.

4. The current and temperature responsive snap acting switch blade as set forth in claim 3 wherein said means for bridging the gap between the ends of said arcuate arms is comprised of a weld fixedly maintaining the gap and attaching said contact button to the bimetallic element.

References Cited by the Examiner
UNITED STATES PATENTS

| | | | |
|---|---|---|---|
| 1,976,781 | 10/34 | Graves | 200—122 |
| 2,199,974 | 5/40 | Whitney. | |
| 2,285,657 | 6/42 | Hickman | 200—171 |
| 2,487,684 | 11/48 | Smith | 200—138 |
| 2,511,526 | 6/50 | Bugge | 200—67 X |
| 2,624,819 | 1/53 | Spina et al. | |
| 2,646,613 | 7/53 | Enzler | 29—155.55 |
| 2,746,131 | 5/56 | Elliott | 29—155.55 |
| 2,776,347 | 1/57 | Allen | 200—61 |
| 2,805,297 | 9/57 | Campbell | 200—67 |
| 2,806,927 | 9/57 | Allen | 200—171 |
| 2,823,283 | 2/58 | Malone | 200—138 |
| 2,856,487 | 10/58 | Mang | 200—113 |
| 3,004,203 | 10/61 | Epstein | 200—122 |

FOREIGN PATENTS 716,096 9/54 Great Britain.
850,549 10/60 Great Britain.

BERNARD A. GILHEANY, *Primary Examiner.*